(12) United States Patent
Miki et al.

(10) Patent No.: US 10,054,819 B2
(45) Date of Patent: Aug. 21, 2018

(54) DISPLAY DEVICE

(71) Applicant: Japan Display Inc., Minato-ku (JP)

(72) Inventors: Hirohisa Miki, Tokyo (JP); Shigesumi Araki, Tokyo (JP)

(73) Assignee: Japan Display Inc., Minato-ku (JP)

( * ) Notice: Subject to any disclaimer, the term of this patent is extended or adjusted under 35 U.S.C. 154(b) by 249 days.

(21) Appl. No.: 15/011,922

(22) Filed: Feb. 1, 2016

(65) Prior Publication Data

US 2016/0223870 A1 Aug. 4, 2016

(30) Foreign Application Priority Data

Feb. 2, 2015 (JP) .................................. 2015-018302

(51) Int. Cl.
*G02F 1/1335* (2006.01)

(52) U.S. Cl.
CPC .. *G02F 1/133617* (2013.01); *G02F 1/133524* (2013.01); *G02F 2202/36* (2013.01)

(58) Field of Classification Search
None
See application file for complete search history.

(56) References Cited

U.S. PATENT DOCUMENTS

| 2004/0041965 | A1* | 3/2004 | Liu .................... G02F 1/133526 349/113 |
| 2004/0169461 | A1* | 9/2004 | Moriyama .......... H01L 51/5016 313/503 |
| 2009/0115713 | A1 | 5/2009 | Kakinuma et al. |
| 2014/0204319 | A1* | 7/2014 | Cai .................... G02F 1/133514 349/106 |

FOREIGN PATENT DOCUMENTS

| JP | 2009-134275 | 6/2009 |
| JP | 2013-254071 | 12/2013 |

* cited by examiner

*Primary Examiner* — Lucy Chien
(74) *Attorney, Agent, or Firm* — Oblon, McClelland, Maier & Neustadt, L.L.P.

(57) ABSTRACT

According to one embodiment, a display device includes an insulating substrate, a wavelength conversion element, a light propagation layer including a light-path portion formed between the insulating substrate and the wavelength conversion element, wherein an area of a surface on the insulating substrate side is greater than an area of a surface on the wavelength conversion element side, and a non-light-path portion formed of a material having a refractive index less than the light-path portion, the light-path portion being sandwiched between the non-light-path portions, and a reflective film formed between the non-light-path portion and the wavelength conversion element.

18 Claims, 7 Drawing Sheets

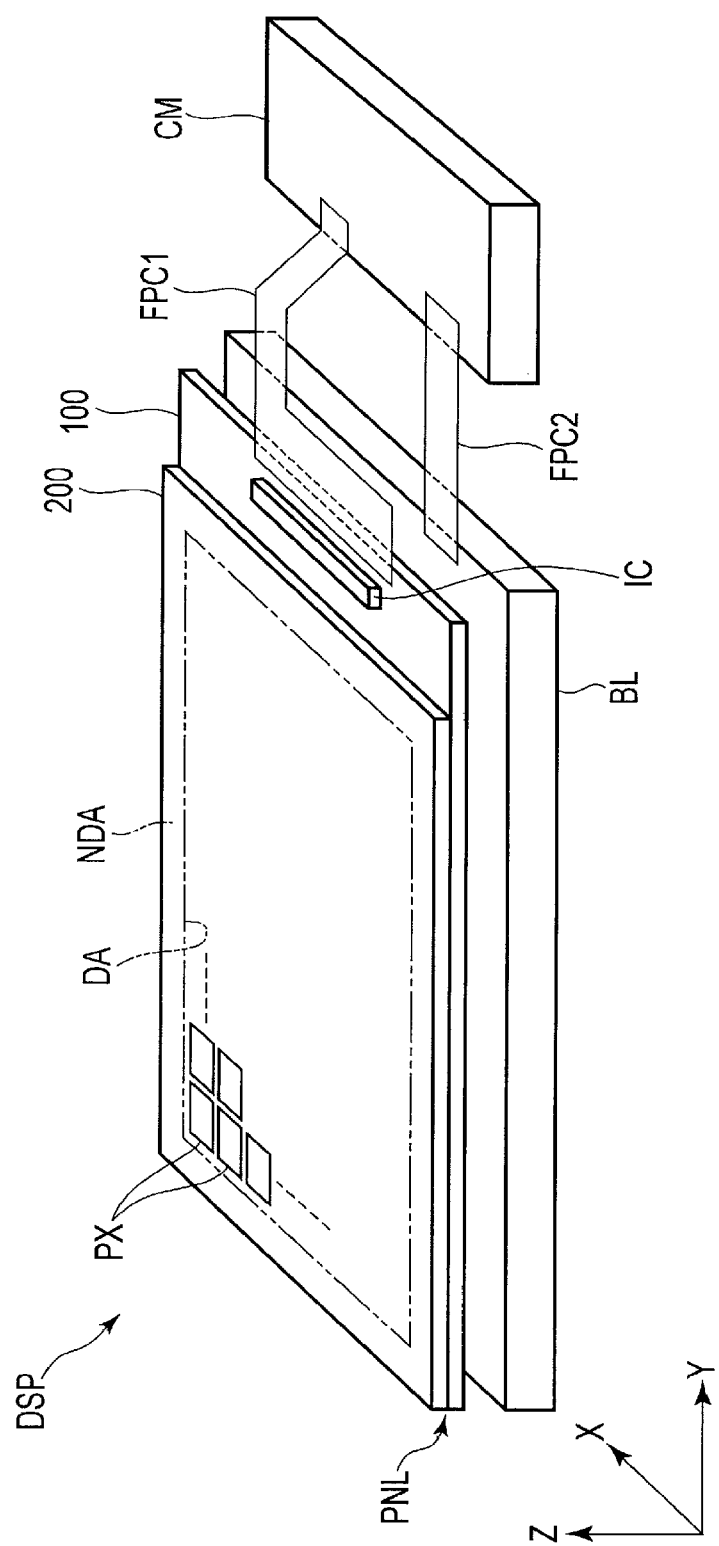
F I G. 1

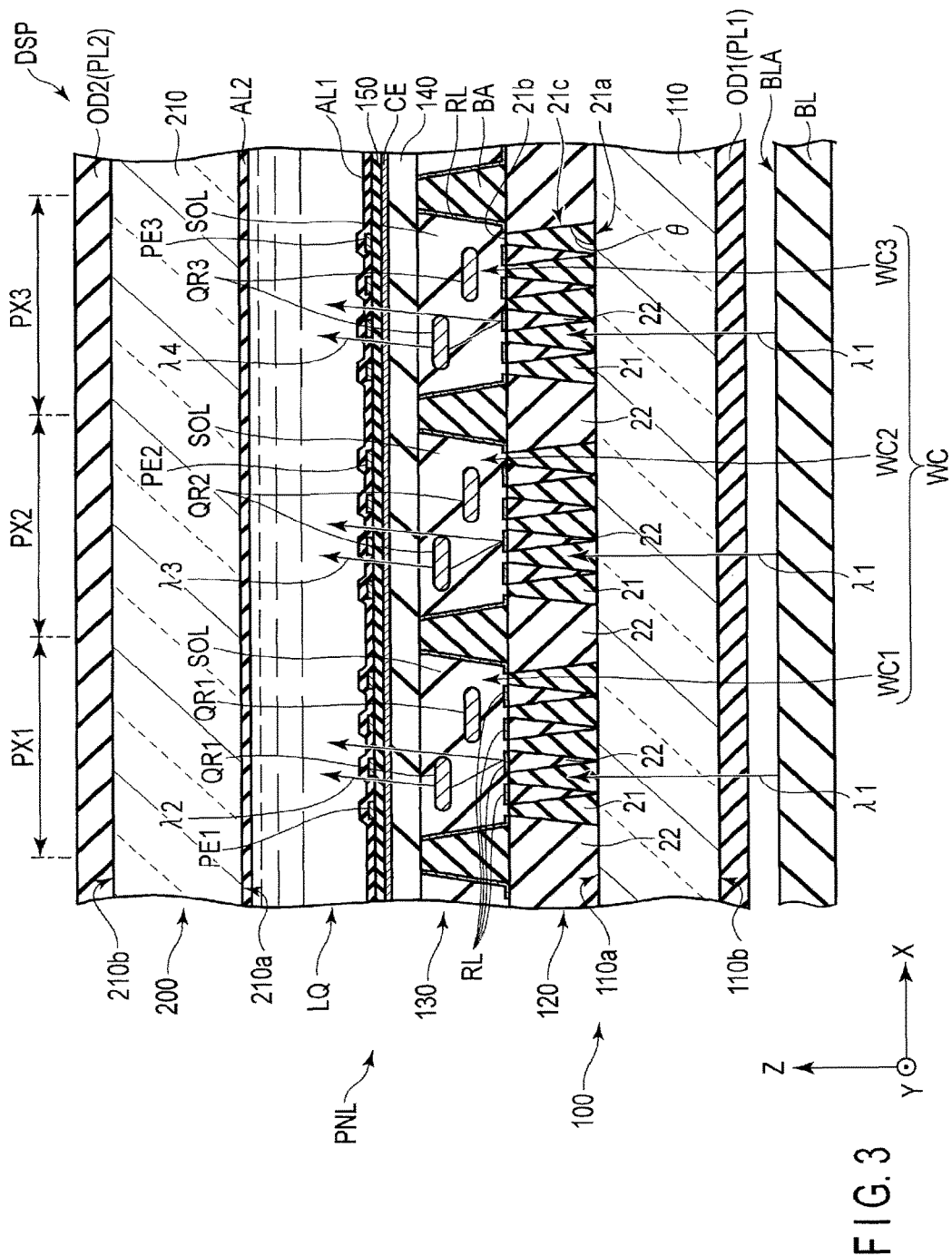
F I G. 3

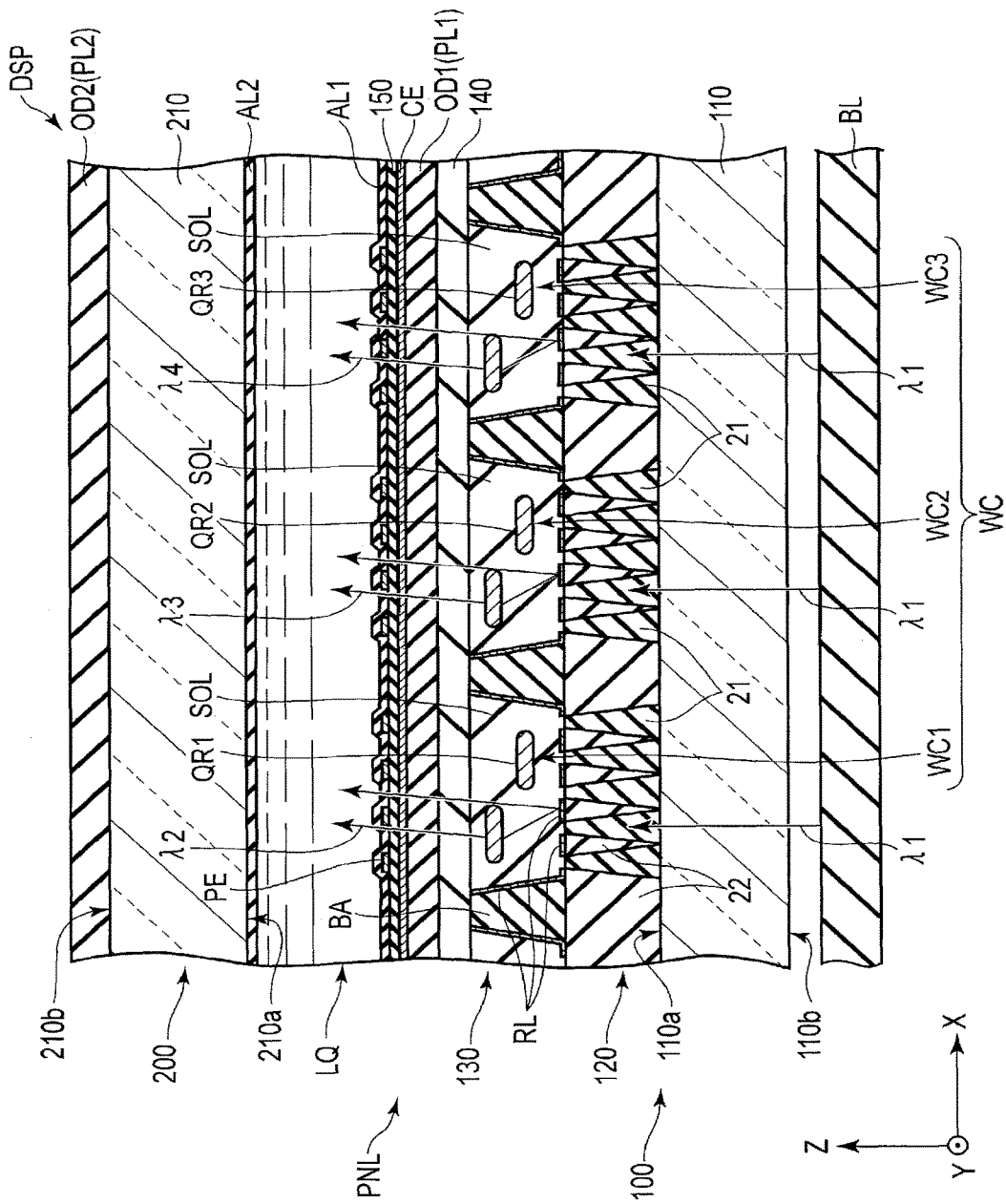
F I G. 6

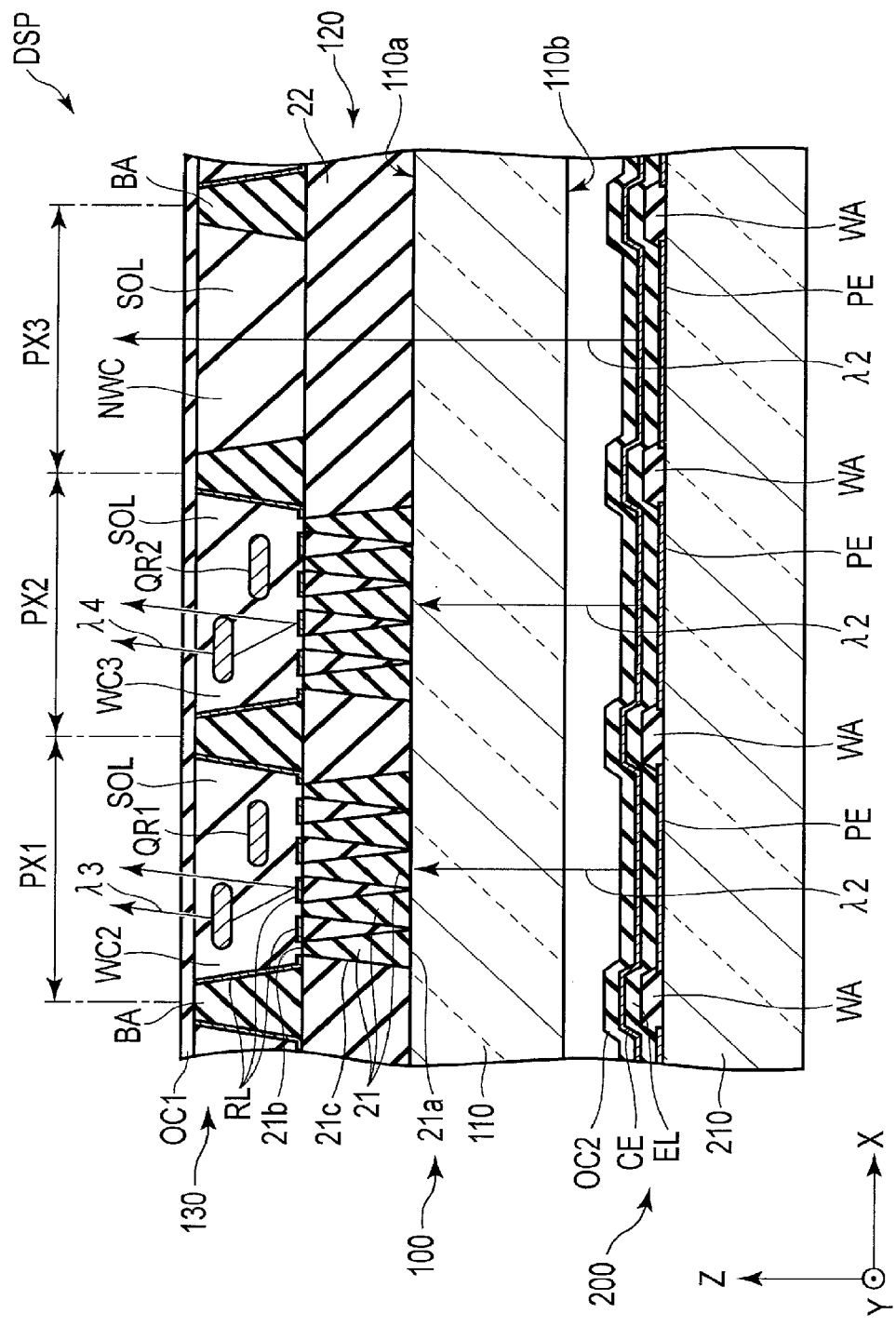
F I G. 8

DISPLAY DEVICE

CROSS-REFERENCE TO RELATED APPLICATIONS

This application is based upon and claims the benefit of priority from Japanese Patent Application No. 2015-018302, filed Feb. 2, 2015, the entire contents of which are incorporated herein by reference.

FIELD

Embodiments described herein relate generally to a display device.

BACKGROUND

As an example of display devices, the following type of liquid crystal display device is known. In the liquid crystal display device, a backlight unit using a white light source is combined with a liquid crystal display panel comprising a color filter using three primary colors of light. The color filter transmits only a specific wavelength band and cuts off the other wavelength bands. Thus, the efficiency of use of light is reduced by the cutoff wavelength bands.

In light of the above factors, a display device which comprises, to improve the efficiency of use of light, a phosphor in place of a color filter is considered. For example, a color liquid crystal display device which comprises a planar light source device (backlight unit) emitting blue light, a phosphor layer absorbing blue light and emitting red or green light, and a light reflective film provided between the phosphor layer and the planar light source device is disclosed. Moreover, a display device which comprises a light absorption layer and a filter layer on a side opposite to the surface facing the light source (backlight) in a phosphor layer including a dichroic dye is disclosed.

BRIEF DESCRIPTION OF THE DRAWINGS

FIG. 1 is a perspective view showing an outline of a display device according to the present embodiment.

FIG. 3 shows a cross-sectional surface of the display device.

FIG. 6 shows a cross-sectional surface of another display device according to the present embodiment.

FIG. 8 shows a cross-sectional surface of a display device comprising a self-luminous element according to the present embodiment.

DETAILED DESCRIPTION

Figure 2:
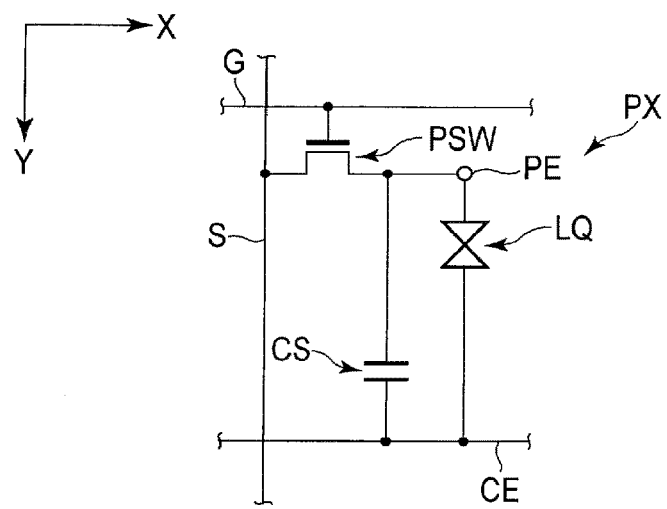
FIG. 2 shows the structure of a pixel.

In general, according to one embodiment, a display device comprises: an insulating substrate; a wavelength conversion element; a light propagation layer comprising: a light-path portion formed between the insulating substrate and the wavelength conversion element, wherein an area of a surface on the insulating substrate side is greater than an area of a surface on the wavelength conversion element side; and a non-light-path portion formed of a material having a refractive index less than the light-path portion, the light-path portion being sandwiched between the non-light-path portions; and a reflective film formed between the non-light-path portion and the wavelength conversion element.

According to another embodiment, a display device comprises: a first substrate; a second substrate provided so as to face the first substrate; and a liquid crystal layer provided between the first substrate and the second substrate, wherein the first substrate comprises: an insulating substrate; a wavelength conversion element; a light propagation layer comprising: a light-path portion formed between the insulating substrate and the wavelength conversion element, wherein an area of a surface on the insulating substrate side is greater than an area of a surface on the wavelength conversion element side; and a non-light-path portion formed of a material having a refractive index less than the light-path portion, the light-path portion being sandwiched between the non-light-path portions; and a reflective film formed between the non-light-path portion and the wavelength conversion element.

Embodiments will be described hereinafter with reference to the accompanying drawings. The disclosure is merely an example, and proper changes within the spirit of the invention, which are easily conceivable by a skilled person, are included in the scope of the invention as a matter of course. In addition, in some cases, in order to make the description clearer, the widths, thicknesses, shapes, etc. of the respective parts are schematically illustrated in the drawings, compared to the actual modes. However, the schematic illustration is merely an example, and adds no restrictions to the interpretation of the invention. Besides, in the specification and drawings, structural elements which fulfill the same functions as or functions similar to those described in connection with preceding drawings are denoted by like reference numerals, and an overlapping detailed description thereof is omitted unless otherwise necessary.

FIG. 1 shows a perspective view showing an outline of a display device according to the present embodiment.

In the present embodiment, it is assumed that the display device comprises a liquid crystal display panel. However, the display device is not limited to this structure and may use, as a display panel, for example, a self-luminous display panel such as an organic electroluminescent display panel, or an electronic paper display panel comprising an electrophoretic element.

The display device DSP comprises, for example, a display panel PNL, a drive IC chip IC which drives the display panel PNL, an illuminating device BL which illuminates the display panel PNL, a control module CM and flexible circuit boards FPC1 and FPC2. In the present embodiment, a first direction X is, for example, the direction of a shorter side of the display panel PNL. A second direction Y is a direction intersecting with the first direction X and is the direction of a longer side of the display panel PNL. A third direction Z is a direction intersecting with the first direction X and the second direction Y.

The display panel PNL comprises a first substrate 100, a second substrate 200 provided so as to face the first substrate 100, and a liquid crystal layer (a liquid crystal layer LQ described later) held between the first substrate 100 and the second substrate 200. The display panel PNL comprises a display area DA which displays an image, and a non-display area NDA which is located around the display area DA and has a frame shape. The display panel PNL comprises pixels PX arrayed in a matrix in the first direction X and the second direction Y in the display area DA.

The backlight unit BL, which is an example of illuminating devices, is provided on the back side of the first substrate 100. Various forms can be applied to the backlight unit BL.

However, the explanation of the detailed structure is omitted here.

The drive IC chip IC is mounted on the first substrate 100 of the display panel PNL. The flexible circuit board FPC1 is mounted on the first substrate 100 and connects the display panel PNL and the control module CM. The flexible circuit board FPC2 connects the backlight unit BL and the control module CM.

The display device DSP having the above structure is equivalent to a transmissive liquid crystal display device having a transmissive display function in which an image is displayed as each pixel PX selectively transmits light entering the display panel PNL from the backlight unit BL. However, the display device DSP may be a reflective liquid crystal display device having a reflective display function in which an image is displayed as each pixel PX selectively reflects outside light entering the display panel PNL from outside. Alternatively, the display device DSP may be a transreflective liquid crystal display device having both of the functions of the transmissive and reflective types. With regard to a reflective liquid crystal display device, as an illuminating device, a frontlight unit may be provided on the front surface side or the display surface side of the display panel PNL. In the following description, a transmissive liquid crystal display device is explained as an example.

FIG. 2 shows the structure of a pixel.

Each pixel PX comprises a switching element PSW, a pixel electrode PE, a common electrode CE, a liquid crystal layer LQ, etc. The switching element PSW is formed by, for example, a thin-film transistor (TFT). The switching element PSW is electrically connected to a gate line G and a signal line S. The gate line G extends in, for example, the first direction X. The signal line S extends in the second direction Y. The gate line G and the signal line S may be formed linearly. Alternatively, at least a part of each of the lines may be bended.

The pixel electrode PE is electrically connected to the switching element PSW. The pixel electrode PE faces the common electrode CE and drives the liquid crystal layer LQ by the electric field generated between the pixel electrode PE and the common electrode CE. For example, storage capacitance CS is formed between the common electrode CE and the pixel electrode PE.

FIG. 3 shows a cross-sectional surface of the display device. In this cross-sectional view, the display device DSP is cut along the first direction X.

The display device DSP comprises, for example, the display panel PNL and the backlight unit BL as stated above. The display panel PNL shown in the figure mainly has a structure conforming to a display mode using the lateral electric field parallel to the main surface of the substrate. However, the display panel PNL is not particularly limited to this structure and may have a structure conforming to a display mode using the vertical electric field perpendicular to the main surface of the substrate, an oblique electric field relative to the main surface of the substrate or a combination of these electric fields. In the display mode using the lateral electric field, for example, a structure in which the first substrate 100 comprises both the pixel electrode PE and the common electrode CE is applicable. In the display mode using the vertical electric field or an oblique electric field, for example, a structure in which the first substrate 100 and the second substrate 200 comprise the pixel electrode PE and the common electrode CE, respectively, is applicable.

Here, the main surface of the substrate indicates a surface parallel to the X-Y plane defined by the first and second directions X and Y orthogonal to each other.

The display panel PNL comprises the first substrate 100, the second substrate 200 and the liquid crystal layer LQ. The first substrate 100 is attached to the second substrate 200 with a predetermined space. The liquid crystal layer LQ is held between the first substrate 100 and the second substrate 200. The backlight unit BL is provided on the back side of the first substrate 100. The backlight unit BL is located on, of the first substrate 100, a side opposite to a side facing the second substrate 200.

The backlight unit BL comprises an exit surface BLA facing the first substrate 100 and emits light having a first wavelength $\lambda 1$ from the exit surface BLA to the first substrate 100. The type of the backlight unit BL is not particularly limited. The backlight unit BL may have any structure as long as it emits light having the first wavelength $\lambda 1$ from the exit surface BLA. For example, the backlight unit BL may employ a direct type in which the light source is provided in a plane parallel to the exit surface BLA, or may employ an edge type in which the light source is provided in the end portion of a light guide plate (not shown). The exit surface BLA may be, of the light guide plate, a surface on a side facing the first substrate 100, or may be the top surface of an optical sheet provided between the light guide plate and the first substrate 100. For example, the first wavelength $\lambda 1$ is equivalent to the peak wavelength in the emission spectrum of the light source. For example, the first wavelength $\lambda 1$ is a wavelength in the blue region from 380 to 490 nm, or a wavelength which is in the ultraviolet region and is less than that in the blue region. As the light source which emits light having the first wavelength $\lambda 1$, for example, a light-emitting diode (LED) or a semiconductor laser is applicable. The light which enters the display panel PNL from the backlight unit BL is preferably light parallel to the normal direction of the main surface of the first substrate 100. Thus, the display device DSP preferably comprises various types of optical elements such as a prism sheet between the backlight unit BL and the first substrate 100 to adjust the angle of incidence of light from the backlight unit BL to the first substrate 100. In the present embodiment, the first substrate 100 is equivalent to the substrate for the display device.

The first substrate 100 comprises a first insulating substrate 110, a wavelength conversion layer 130, a light propagation layer 120, a reflective film RL, a first insulating film 140, a common electrode CE, a second insulating film 150, pixel electrodes PE1 to PE3 and a first alignment film AL1. In this figure, the switching element, the gate line, the signal line and various types of insulating films are omitted.

The first insulating substrate 110 is formed of an insulating material having a light transmissive property, such as a glass substrate or a resin substrate. The first insulating substrate 110 comprises a first main surface 110a on a side facing the second substrate 200, and a second main surface 110b located on a side opposite to the first main surface 110a. The second main surface 110b is located on a side facing the backlight unit BL.

The wavelength conversion layer 130 is formed above the first insulating substrate 110. The wavelength conversion layer 130 comprises a wavelength conversion element WC and a bank BA. The wavelength conversion element WC and the bank BA are formed on a side facing the first main surface 110a of the first insulating substrate 110. The wavelength conversion element WC comprises, for example, a first wavelength conversion element WC1, a second wavelength conversion element WC2 and a third wavelength conversion element WC3. The first wavelength conversion element WC1, the second wavelength conversion element WC2 and the third wavelength conversion element WC3 are formed in a first pixel PX1, a second pixel PX2 and a third pixel PX3, respectively. The bank BA is formed between the wavelength conversion elements and is located in each border of the pixels. The bank BA is formed of, for example, a resin material. Moreover, the bank BA may have a light shielding property. When the bank BA is covered by the reflective film RL, the bank BA may be formed of a transparent resin material.

The first wavelength conversion element WC1 comprises a solid-phase supporter SOL and a first quantum rod QR1 which is a bar-shaped quantum dot dispersed in the solid-phase supporter SOL. The second wavelength conversion element WC2 comprises the solid-phase supporter SOL and a second quantum rod QR2 which is a bar-shaped quantum dot dispersed in the solid-phase supporter SOL. The third wavelength conversion element WC3 comprises the solid-phase supporter SOL and a third quantum rod QR3 which is a bar-shaped quantum dot dispersed in the solid-phase supporter SOL. The solid-phase supporter SOL is formed of a resin material such as thermosetting resin or photosetting resin. The long axes of the first quantum rod QR1, the second quantum rod QR2 and the third quantum rod QR3 are aligned in a direction parallel to the first main surface 110a. The first quantum rod QR1 absorbs light having the first wavelength $\lambda 1$ emitted by the backlight unit BL and emits light having a second wavelength $\lambda 2$ greater than the first wavelength $\lambda 1$. The second quantum rod QR2 emits light having a third wavelength $\lambda 3$ greater than the first wavelength $\lambda 1$. The third quantum rod QR3 emits light having a fourth wavelength $\lambda 4$ greater than the first wavelength $\lambda 1$. For example, the first wavelength $\lambda 1$ is a wavelength in the ultraviolet region. The second wavelength $\lambda 2$ is a wavelength in the blue region. The third wavelength $\lambda 3$ is a wavelength in the green region. The fourth wavelength $\lambda 4$ is a wavelength in the red region.

The wavelength conversion element WC is not limited to the structure comprising three wavelength conversion elements. For example, when a backlight unit BL which emits light in the blue region as the first wavelength $\lambda 1$ is applied, the first wavelength conversion element WC1 described above may be omitted.

Each quantum rod is a bar-shaped quantum dot whose outer shape has a long axis and a short axis. The dimension along the long axis and the short axis of the quantum rod is several nanometers to several tens of nanometers. In the present embodiment, each quantum rod is formed by a group II-VI semiconductor or a group III-V semiconductor having a wurtzite or zinc blende crystalline structure. The polar axis of the quantum rod is the c-axis or the <111> axis and conforms to the long axis. The quantum rod forms, for example, a core-shell structure. The core is located in the center of the quantum rod and is formed of, for example, cadmium selenate (CdSe), cadmium telluride (CdTe) or indium phosphide (InP). The shell covers the core and stabilizes the core physically and chemically. In some cases, organic molecules modify the surrounding area of the shell. The shell is formed of, for example, zinc sulfide (ZnS) or cadmium sulfide (CdS). The quantum rod has wavelength selectivity for emission depending on the type and size of the semiconductor of the core. In this manner, it is possible to form a quantum rod having a suitable wavelength for emission, and allocate the quantum rod in the first wavelength conversion element WC1, the second wavelength conversion element WC2 and the third wavelength conversion element WC3.

The light propagation layer 120 is located between the first insulating substrate 110 and the wavelength conversion element WC. The light propagation layer 120 comprises a light-path portion 21 and a non-light-path portion 22. The light-path portion 21 penetrates the light propagation layer 120 in the third direction Z.

The light-path portion 21 is formed so as to face the wavelength conversion element WC. The light-path portion 21 comprises a lower surface 21a facing the first insulating substrate 110, an upper surface 21b facing the wavelength conversion element WC, and a side surface 21c connecting the lower surface 21a and the upper surface 21b. The lower surface 21a is in contact with the first main surface 110a of the first insulating substrate 110. The upper surface 21b is in contact with one of the wavelength conversion elements WC. The area of the lower surface 21a is greater than that of the upper surface 21b. In the cross-sectional view shown in FIG. 3, the light-path portion 21 is formed in a tapered shape in which the width along the first direction X is reduced from the first main surface 110a of the first insulating substrate 110 to the wavelength conversion layer 130. In the example shown in the figure, a plurality of light-path portions 21 are provided for each pixel and are arranged in the first direction X. In each light-path portion 21, the angle θ defined by the lower surface 21a and the side surface 21c is preferably set such that the angle of incidence on the side surface 21c is greater than the critical angle as the light which entered the first main surface 110a in the normal direction (in other words, the third direction Z) should be subjected to total internal reflection on the side surface 21c. The angle θ is an angle defined by linear portions in the cross-sectional view such as an angle defined by the vicinity of the center of the side surface 21c and the vicinity of the center of the lower surface 21a in the vertical direction. The greater the area, of the lower surface 21a is, the more desirable it is. For example, the area of the lower surface 21a is substantially equal to that of, of the first insulating substrate 110, a region facing the wavelength conversion element WC. When each of the wavelength conversion elements faces a plurality of light-path portions 21 as shown in the example of the figure, the lower surfaces 21a of adjacent light-path portions 21 are preferably continuous, and further, preferably, the non-light-path portion 22 is not interposed between the adjacent lower surfaces 21a. The area of the upper surface 21b is preferably as small as possible in a range which can deliver light to the wavelength conversion element WC. The light-path portions 21 are formed of a material having a high refractive index such as transparent resin.

The non-light-path portions 22 are provided such that each light-path portion 21 is sandwiched between the non-light-path portions 22. In the example shown in the figure, each non-light-path portion 22 is provided between a plurality of light-path portions 21. Each non-light-path portion 22 is in contact with the side surface 21c of the light-path portion 21 and is not in contact with the lower surface 21a or the upper surface 21b. The non-light-path portion 22 is also formed between the bank BA and the first insulating substrate 110. In the cross-sectional view shown in FIG. 3, the non-light-path portion 22 is formed in a reverse tapered shape in which the width along the first direction X is increased from the first main surface 110a of the first insulating substrate 110 to the wavelength conversion layer 130. The non-light-path portions 22 are formed of a transparent resin material having a low refractive index. The refractive index of this material is less than that of the light-path portions 21. The materials of the light-path portions 21 and the non-light-path portions 22 are, for example, acrylic materials, methacrylate materials, silicon oxide or silicon nitride.

The reflective film RL is formed between the non-light-path portion 22 and the first wavelength conversion element WC1, between the non-light-path portion 22 and the second wavelength conversion element WC2 and between the non-light-path portion 22 and the third wavelength conversion element WC3. Further, the reflective film RL is formed between the bank BA and the first wavelength conversion element WC1, between the bank BA and the second wavelength conversion element WC2 and between the bank BA and the third wavelength conversion element WC3.

The first insulating film 140 is formed on, of the wavelength conversion layer 130, a side facing the liquid crystal layer LQ. The first insulating film 140 reduces the irregularity of, of the bank BA and the wavelength conversion elements WC, sides facing the liquid crystal layer LQ. The first insulating film 140 has a substantially flat surface on the side on which the common electrode CE is formed. The first insulating film 140 is formed of, for example, an organic insulating material. When, the irregularity of, of the bank BA and the wavelength conversion element WC, sides facing the liquid crystal layer LQ is small, the first insulating film 140 may be formed of an inorganic insulating material. Alternatively, the first insulating film 140 may be omitted.

The common electrode CE is formed on, of the first insulating film 140, a side facing the liquid crystal layer LQ. The common electrode CE is provided over the pixels PX1 to PX3. The second insulating film 150 is formed on, of the common electrode CE, a side facing the liquid crystal layer LQ. The second insulating film 150 is formed of an inorganic insulating material such as silicon nitride or silicon oxide. The pixel electrodes PE1 to PE3 are provided in the respective pixels PX, and are formed in, of the second insulating film 150, an area facing the wavelength conversion element WC on a side facing the liquid crystal layer LQ. More specifically, in the pixel PX1, the pixel electrode PE1 is formed in an area facing the wavelength conversion element WC1. In the pixel PX2, the pixel electrode PE2 is formed in an area facing the wavelength conversion element WC2. In the pixel PX3, the pixel electrode PE3 is formed in an area facing the wavelength conversion element WC3. The common electrode CE and the pixel electrodes PE1 to PE3 are formed of a transparent conductive material such as indium tin oxide (ITO) or indium zinc oxide (IZO). The first alignment film AL1 is formed on, of the second insulating film 150, a side facing the liquid crystal layer LQ. The first alignment film AL1 covers the pixel electrodes PE1 to PE3.

The second substrate 200 comprises a second insulating substrate 210 and a second alignment film AL2. The second insulating substrate 210 is formed of an insulating material having a light transmissive property such as a glass substrate or a resin substrate. The second alignment film AL2 is formed on, of the second insulating substrate 210, a side facing the liquid crystal layer LQ. The first alignment film AL1 and the second alignment film AL2 are formed of a resin material such as polyimide. An alignment treatment process is applied to the first alignment film AL1 and the second alignment film AL2 as necessary. The first alignment film AL1 and the second alignment film AL2 are formed of a material having an alignment property suitable for the display mode of the liquid crystal, such as a horizontal alignment or vertical alignment property.

The display device DSP further comprises a first optical element OD1 and a second optical element OD2. The first optical element OD1 is provided on the second main surface 110b side of the first insulating substrate 110. The first optical element OD1 is provided between the first insulating substrate 110 and the backlight unit BL. The first optical element OD1 comprises a first polarizer PL1. The second optical element OD2 is provided on the main surface 210b side of the second insulating substrate 210. Here, the main surface 210b is, of the second insulating substrate 210, a surface opposite to a side facing the liquid crystal layer LQ. The second optical element OD2 comprises a second polarizer PL2. In other words, the first polarizer PL1 and the second polarizer PL2 are provided outside the area between the wavelength conversion element WC and the first insulating substrate 110. The first optical element OD1 and the second optical element OD2 may comprise another optical function layer such as a retardation film.

For example, the first polarizer PL1 and the second polarizer PL2 are provided in the positional relationship of cross-Nicol, in which the respective transmission axes cross at right angles. At this time, the first polarizer PL1 preferably has a transmission axis parallel to the alignment direction of the long axes of the first quantum rod QR1, the second quantum rod QR2 and the third quantum rod QR3. The second polarizer PL2 preferably has a transmission axis perpendicular to the alignment direction of the long axes of the first quantum rod QR1, the second quantum rod QR2 and the third quantum rod QR3. The first polarizer PL1 and the second polarizer PL2 may be film polarizers in which a resin material such as polyvinyl alcohol is dyed with iodine or pigment, or may be wire grid polarizers in which fine metal lines are arrayed with equal pitches.

Now, this specification explains an operation in the display device DSP according to the present embodiment. Here, this specification looks at the pixel PX1. The light having the first wavelength $\lambda 1$ emitted from the backlight unit BL enters the first polarizer PL1 of the first optical element OD1. Out of the light which entered the first polarizer PL1, the linearly polarized light having a polarization component parallel to the transmission axis of the first polarizer PL1 is transmitted and enters the first substrate 100. The linearly polarized light which entered the first substrate 100 passes through the light-path portion 21 in the light propagation layer 120 and enters the first wavelength conversion element WC1. Out of the light emitted from the backlight unit BL, the light which entered the non-light-path portion 22 does not enter the first wavelength conversion element WC1, and is reused after the light is reflected by the reflective film RL toward the backlight unit BL side. The first quantum rod QR1 absorbs the linearly polarized light having the first wavelength $\lambda 1$ which entered the first wavelength conversion element WC1, and emits light having the second wavelength $\lambda 2$ which is polarized in a direction parallel to the long axis of the first quantum rod QR1. A part of the linearly polarized light emitted from the first quantum rod QR1 is propagated toward the liquid crystal layer LQ. The other part is propagated toward the liquid crystal layer LQ after the light is reflected by the reflective layer RL at least once. The linearly polarized light having the second wavelength $\lambda 2$ which entered the liquid crystal layer LQ is changed in the polarization state in accordance with the retardation of the liquid crystal layer LQ. The details are omitted here. However, briefly speaking, the retardation of the liquid crystal layer LQ is controlled by the alignment state of the liquid crystal molecules included in the liquid crystal layer LQ. The alignment state of the liquid crystal molecules is controlled by the electric field between the pixel electrode PE1 and the common electrode CE. For example, in an off-state where no electric field is formed between the pixel electrode PE1 and the common electrode CE, the retardation of the liquid crystal layer LQ is substantially zero. The linearly polarized light having the second wavelength λ2 which is transmitted through the liquid crystal layer LQ is transmitted through the second substrate 200 while maintaining the polarization state, and is absorbed in the second polarizer PL2. Thus, in an off-state, black display is performed in the pixel PX1. When the retardation of the liquid crystal layer LQ is λ/2 in an on-state where an electric field is formed between the pixel electrode PE1 and the common electrode CE, the linearly polarized light having the second wavelength λ2 which is transmitted through the liquid crystal layer LQ is rotated by 90° in the X-Y plane in the polarization state, is transmitted through the second substrate 200, and is transmitted through the second polarizer PL2. In an on-state, the pixel PX1 displays the color of the second wavelength λ2. Similarly, in the PX2, black display is performed in an off-state, and the color of the third wavelength λ3 is displayed in an on-state. In the pixel PX3, black display is performed in an off-state, and the color of the fourth wavelength λ4 is displayed in an on-state.

In a manner different from that of a display device comprising a color filter which absorbs light other than light having a desired wavelength from white light having a multiple wavelength, the present embodiment realizes color display by converting substantially monochromatic light emitted from the light source into light having a desired wavelength by means of the wavelength conversion layer 130. Thus, the efficiency of use of the light emitted from the light source can be improved. For example, a reflective film which has wavelength selectivity to transmit light having a specific wavelength and reflect or absorb light having the other wavelengths is not interposed between the light-path portion 21 of the light propagation layer 120 and the wavelength conversion layer 130. Thus, the light which was propagated through the light-path portion 21 is introduced into the wavelength conversion layer 130 without causing a much loss such as refection or absorption. In addition, the area of the lower surface 21a of the light-path portion 21 located on the incident side (or the light source side) of the light propagation layer 120 is greater than that of the upper surface 21b located on the exit side (or the wavelength conversion layer 130 side) of the light propagation layer 120. Therefore, a large amount of incident light from the lower surface 21a can be taken in. Thus, in the present embodiment, when the light emitted from an external light source such as the backlight unit BL enters the first substrate 100, the light can be introduced into the wavelength conversion layer 130 through the light propagation layer 120 with high efficiency of use. In the wavelength conversion layer 130, the light which entered the first substrate 100 can be converted into light having another wavelength with high efficiency of use.

By making the angle of incidence of the light entering the side surface 21c of the light-path portion 21 greater than the critical angle, the light which entered the light-path portion 21 along the normal direction of the first main surface 110a is subjected to total internal reflection on the side surface 21c. Thus, the light which entered the light-path portion 21 can be efficiently introduced into the wavelength conversion layer 130 without deviating to the non-light-path portion 22.

By setting the area of the upper surface 21b of the light-path portion 21 so as to be small, the area of the reflective film RL formed between the non-light-path portion 22 and the wavelength conversion layer 130 can be made large. Thus, it is possible to further efficiently reflect the light converted in the wavelength conversion layer 130 to a side opposite to the first insulating substrate 110.

Moreover, the display device DSP comprises the first substrate (the substrate for the display device) 100 described above. Since the first polarizer PL1 has a transmission axis parallel to the long axis of the first quantum rod QR1, the absorption efficiency and the conversion efficiency of light of the first quantum rod QR1 is improved. The second polarizer PL2 has a transmission axis orthogonal to the long axis of the first quantum rod QR1. Therefore, black displayed is realized in an off-state, and further, color display is realized in an on-state. In an off-state, a normally-black mode for black display is preferably applied to prevent the reduction of visibility because of reflection of outside light in the pixel electrode PE and the reflective film RL.

Figure 4:
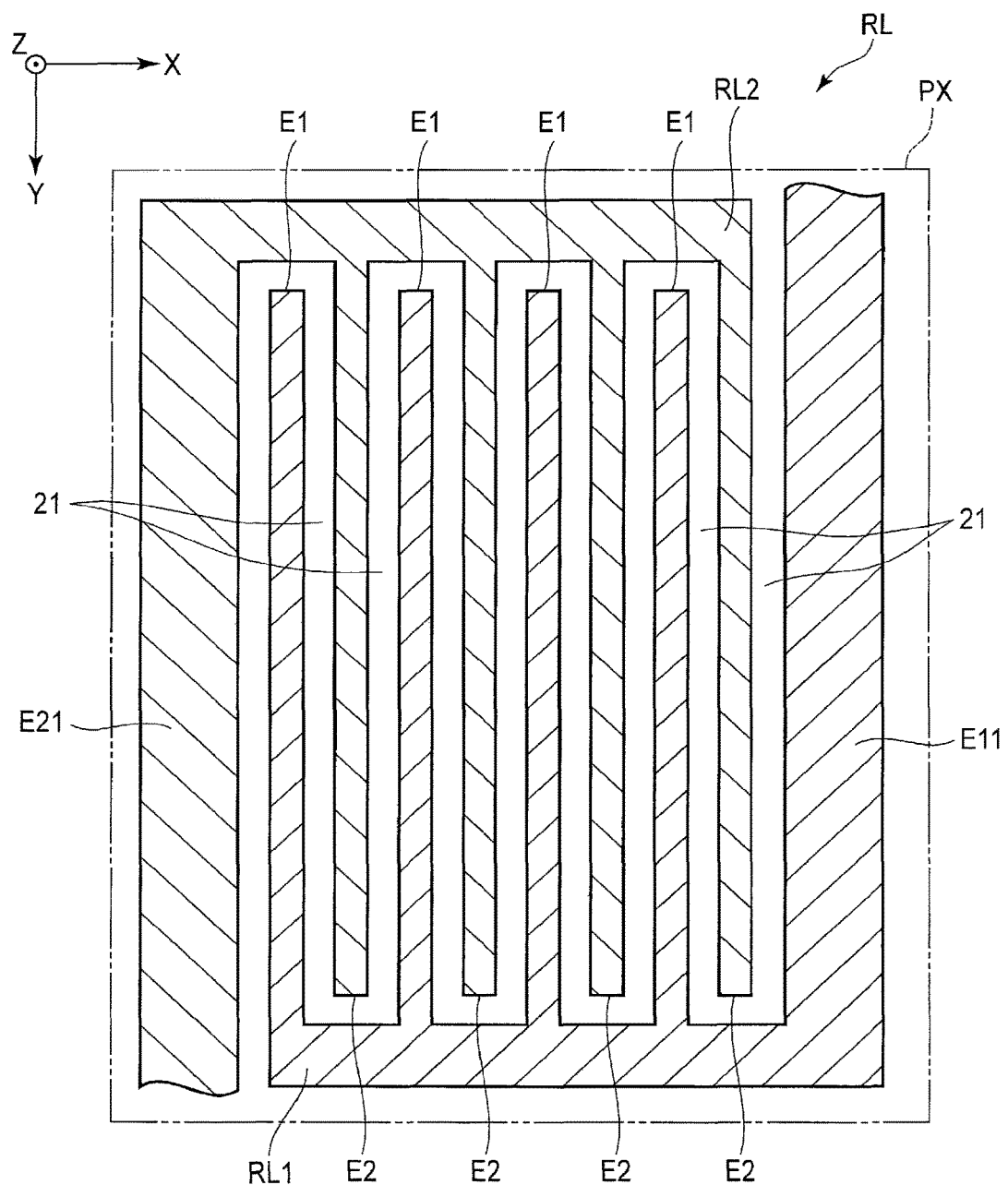
FIG. 4 shows the structure of a reflective film.

FIG. 4 shows the structure of the reflective film.

The reflective film RL is formed of a conductive material having light reflectivity such as silver, aluminum or other alloys. The reflective film RL may be a monolayer film formed of a metal material, or may be a stacked film in which thin films formed of a plurality of types of metal materials are stacked. FIG. 4 shows only the reflective film RL provided in a single pixel PX. The reflective film RL comprises a first comb electrode RL1 comprising a plurality of first electrode portions E1, and a second comb electrode RL2 comprising a plurality of second electrode portions E2. The first electrode portions E1 extend in the second direction Y. The second electrode portions E2 extend in the second direction Y which is the same as the extension direction of the first electrode portions E2. The first electrode portions E1 are away from the second electrode portions E2. The first electrode portions E1 and the second electrode portions E2 are alternately arranged in the first direction X. Each of the first electrode portions E1 and the second electrode portions E2 is formed in a band shape having substantially the same width as the others in the first direction X. The width of the first electrode portions E1 and the second electrode portions E2 is equal to that of the non-light-path portion 22 shown in FIG. 3 in the first direction X. The light-path portions 21 are exposed between the first electrode portions E1 and the second electrode portions E2. The interval between the first electrode portions E1 and the second electrode portions E2 in the first direction X is equal to the width of the light-path portion 21 in the first direction X. The first electrode portion E11 located at the right end in the figure is formed wider than the other first electrode portions E1. The second electrode portion E21 located at the left end in the figure is formed wider than the other second electrode portions E2.

Figure 5:
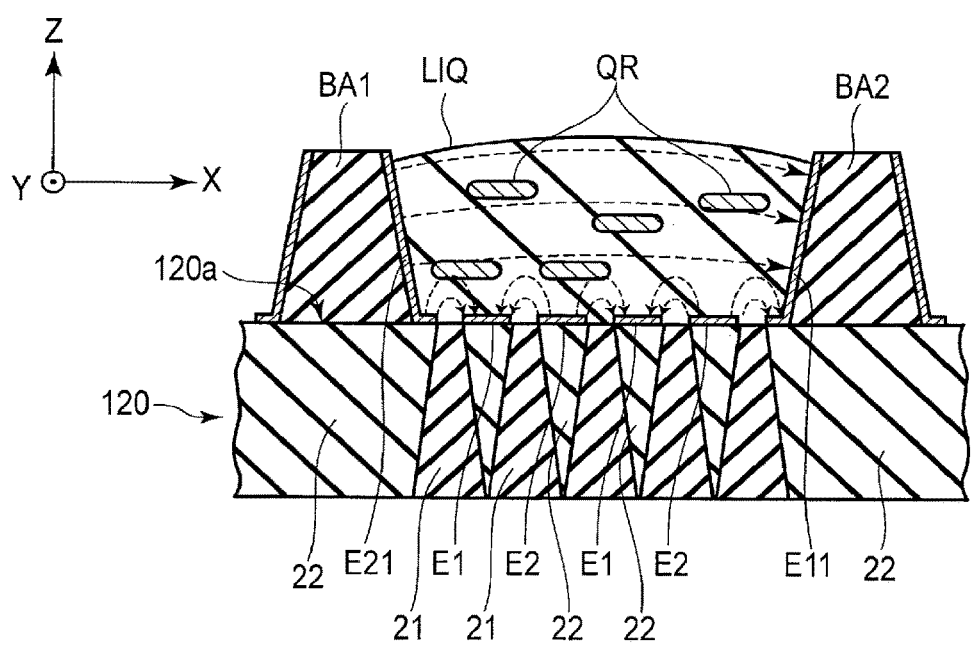
FIG. 5 shows a method for forming a wavelength conversion layer.

FIG. 5 shows a method for forming the wavelength conversion layer.

Now, this specification briefly explains an example of the method for forming the wavelength conversion layer 130 with reference to FIG. 5. First, a bank BA1 and a bank BA2 are formed on a main surface 120a of the light propagation layer 120. Subsequently, the first electrode portions E1 and the second electrode portions E2 of the reflective film RL are formed on a side surface of the bank BA1, a side surface of the bank BA2 and an area equivalent to the non-light-path portions 22 on the main surface 120a. At this time, in the example shown in the figure, the second electrode portion E21 is provided on the side surface of the bank BA1. The first electrode portion E11 is provided on the side surface of the bank BA2. The other first electrode portions E1 and the other second electrode portions E2 are alternately provided in positions overlapping the non-light-path portions 22 between the first electrode portion E11 and the second electrode portion E21. Subsequently, a liquid-phase supporter LIQ in liquid form containing a raw material such as photosetting resin or thermosetting resin is provided in the area sectionalized by the bank BA1 and the bank BA2. The quantum rod QR is dispersed in the liquid-phase supporter LIQ. To provide the liquid-phase supporter LIQ, for example, an ink-jet method or a printing method can be applied. An electric field is generated between the first electrode portions E1 and the second electrode portions E2 by applying voltage to the first electrode portions E1 and the second electrode portions E2 before applying cure treatment to the liquid-phase supporter LIQ after the provision of the liquid-phase supporter LIQ. The electric field formed between the first electrode portion E11 formed on the side surface of the bank BA2 and the second electrode portion E21 formed on the side surface of the bank BA1 crosses the liquid-phase supporter LIQ. The direction of this electric field is substantially parallel to the main surface 120a. A curved electric field is formed between the first electrode portions E1 and the second electrode portions E2 in the area sectionalized by the bank BA1 and the bank BA2. As shown in FIG. 4, each of the first electrode portions E1 and the second electrode portions E2 is formed in a band shape extending in the second direction Y. Therefore, the electric field between the first electrode portions E1 and the second electrode portions E2 is formed substantially along the first direction X in the X-Y plane. Since the quantum rod QR has a polar character in the direction of the long axis of the quantum rod QR, the long axis is aligned with the electric field. In the cross-sectional view shown in FIG. 5, the long axis of the quantum rod QR is aligned in a direction parallel to the main surface 120a. In the plan view shown in FIG. 4, the long axis of the quantum rod QR is aligned in the first direction X in which the first electrode portions E1 and the second electrode portions E2 are arranged. Subsequently, the liquid-phase supporter LIQ is cured while the quantum rod QR is being aligned. As a result, the liquid-phase supporter LIQ is changed to the solid-phase supporter SOL. Thus, the alignment of the quantum rod QR is fixed.

As stated above, the reflective film RL comprises a plurality of first electrode portions E1, and a plurality of second electrodes E2 which are away from the first electrode portions E1 and are arranged alternately with respect to the first electrode portions E1. Thus, the quantum rod QR can be provided in a state where the long axis of the quantum rod QR is aligned along the direction in which the first electrode portions E1 and the second electrode portions E2 are arranged. The polarization direction of light emitted from the quantum rod QR conforms to the direction of the long axis of the quantum rod QR; in other words, the direction of the polarization axis. Since the long axis of the quantum rod QR is aligned uniformly, the wavelength conversion element WC is capable of emitting light polarized in the direction in which the long axis of the quantum rod QR is aligned. Thus, the quantum rod QR can be provided between the first polarizer PL1 and the second polarizer PL2 in the liquid crystal display device. In this manner, the flexibility of designing of the display device can be improved.

Figure 7:
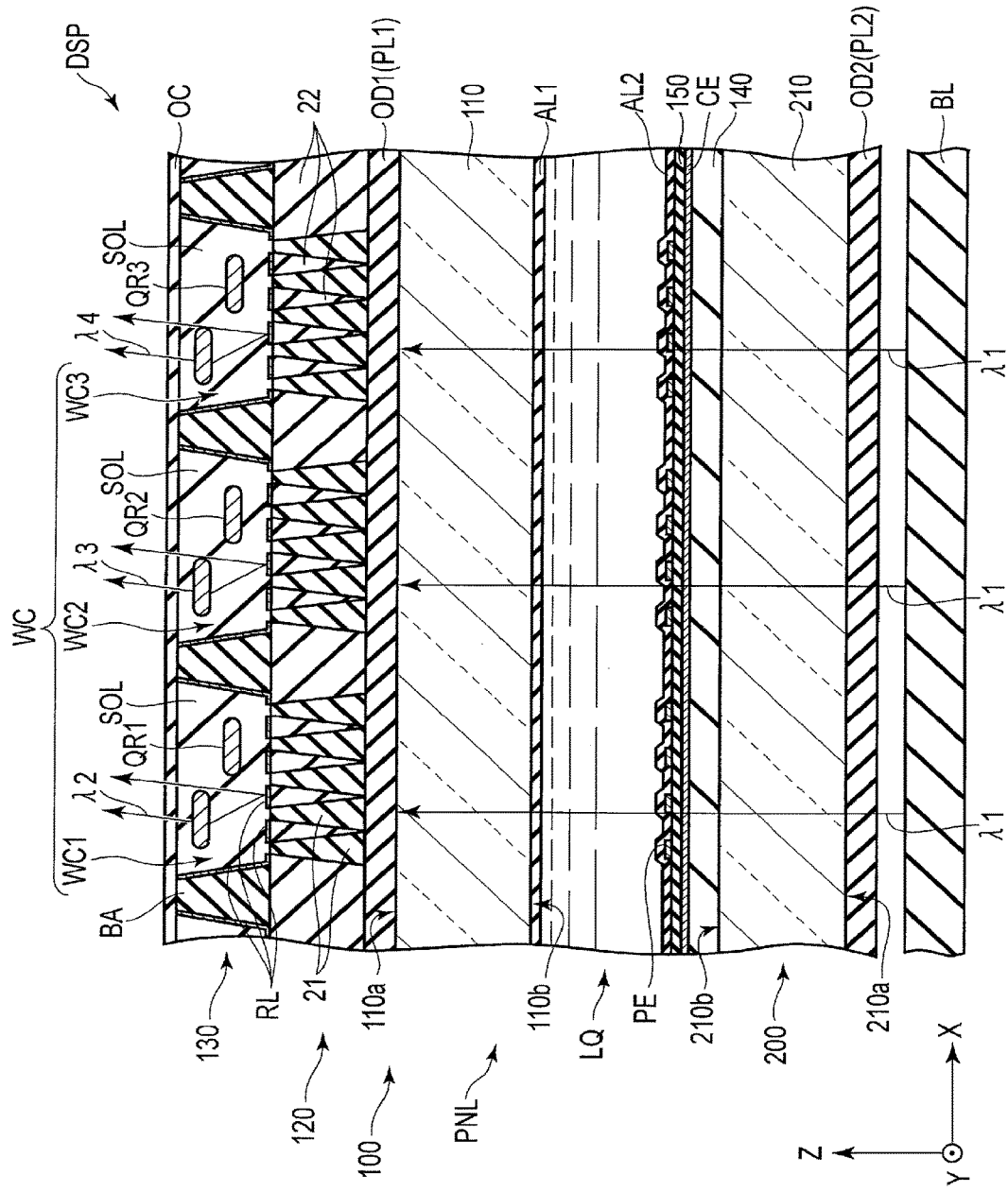
FIG. 7 shows a cross-sectional surface of another display device according to the present embodiment.

Now, this specification explains other display devices DSP in the present embodiment with reference to FIG. 6 to FIG. 8.

FIG. 6 shows a cross-sectional surface of another display device according to the present embodiment.

The display device DSP shown in FIG. 6 is different from the display device DSP shown in FIG. 3 in respect that at least the first polarizer PL1 included in the first optical element OD1 is provided on, of the wavelength conversion layer 130, a side opposite to the light propagation layer 120 (in other words, a side facing the liquid crystal layer LQ). The other structures are the same as those of the display device DSP shown in FIG. 3. Thus, the first polarizer PL1 is provided between the wavelength conversion layer 130 of the first substrate 100 and the liquid crystal layer LQ. In the example shown in FIG. 6, the first optical element OD1 including the first polarizer PL1 is provided between the first insulating film 140 and the common electrode CE. When the first polarizer PL1 is included in the first substrate 100 in this manner, the first polarizer PL1 may be a film polarizer; however, the first polarizer PL1 is preferably a wire grid polarizer, which is less affected by, for example, thermal processing in the manufacturing process of the first substrate 100. The positional relationship between the backlight unit BL or the second optical element OD2 and the display panel PNL is the same as that of the display device DSP shown in FIG. 3. The backlight unit BL is provided on the second main surface 110b side of the first insulating substrate 110; in other words, on the back side of the first substrate 100. The second polarizer PL2 is provided on the main surface 210b side of the second insulating substrate 210; in other words, on the external surface side of the second substrate 200.

In this embodiment, an effect similar to that of the above description can be obtained. Even when the polarization degree of light emitted from the first quantum rod QR1, the second quantum rod QR2 and the third quantum rod QR3 in the wavelength conversion layer 130 is comparatively low, the light is introduced into the liquid crystal layer LQ through the first polarizer PL1. Thus, light other than light having a desired polarization direction is absorbed in the first polarizer PL1. In this manner, it is possible to prevent light leak because of light other than light having a desired polarization direction. A display device having an excellent contrast ratio can be provided.

In the present embodiment, the wavelength conversion layer 130 is provided lower than the first polarizer PL1. Thus, the light which passed through the wavelength conversion layer 130 may not be polarized in a specific direction. The wavelength conversion layer 130 may comprise a quantum dot in place of the first quantum rod QR1, the second quantum rod QR2 and the third quantum rod QR3, and may convert the wavelength of light by means of the quantum dot.

FIG. 7 shows a cross-sectional surface of another display device according to the present embodiment.

The display device DSP shown in FIG. 7 is different from the display device DSP shown in FIG. 3 in the following respect: the second substrate 200 is provided between the liquid crystal layer LQ and the backlight unit BL, and the first substrate 100 is provided on the display surface side (in other words, a side away from the backlight unit BL) compared with the liquid crystal layer LQ. In the example shown in FIG. 7, the first optical element OD1 including the first polarizer PL1 is provided between the first insulating substrate 110 and the light propagation layer 120. However, the first optical element OD1 may be provided between the first insulating substrate 110 and the first alignment film AL1. In other words, the first polarizer PL1 is provided between the first substrate 100 and the liquid crystal layer LQ or between the first insulating substrate 110 and the wavelength conversion element WC.

The backlight unit BL is provided on, of the second insulating substrate 210, the main surface 210a side opposite to a side facing the liquid crystal layer LQ. The main surface 210a side is equivalent to the back side of the second substrate 200. The second optical element OD2 including the second polarizer PL2 is provided between the second substrate 200 and the backlight unit BL. The first insulating film 140 is provided on, of the second insulating substrate 210, the main surface 210b side facing the liquid crystal layer LQ. The common electrode CE is provided on, of the first insulating film 140, a side facing the liquid crystal layer LQ. The second insulating film 150 is provided on, of the common electrode CE, a side facing the liquid crystal layer LQ. The pixel electrode PE is provided on, of the second insulating film 150, a side facing the liquid crystal layer LQ. The second alignment film AL2 is provided on, of the second insulating film 150, a side facing the liquid crystal layer LQ. The second alignment film AL2 covers the pixel electrode PE.

The first alignment film AL1 is provided on, of the first insulating substrate 110, the main surface 110b side facing the liquid crystal layer LQ. The first optical element OD1 including the first polarizer PL1 is provided on, of the first insulating substrate 110, the main surface 110a side opposite to a side facing the liquid crystal layer LQ. As shown in the example of FIG. 7, the first substrate 100 preferably comprises an overcoat layer OC which protects the wavelength conversion layer 130 on, of the wavelength conversion layer 130, a side opposite to a side facing the liquid crystal layer LQ.

In this embodiment, an effect similar to that of the above description can be obtained.

FIG. 8 shows a cross-sectional surface of a display device comprising a self-luminous element according to the present embodiment.

The display device DSP comprises the first substrate 100 and the second substrate 200 facing the first substrate 100. The second substrate 200 comprises a self-luminous element which emits light having the second wavelength $\lambda 2$. For example, the second wavelength $\lambda 2$ is a wavelength in the blue region. The second substrate 200 comprises a self-luminous element which emits blue light.

In a manner similar to that of the example shown in FIG. 3, the first substrate 100 comprises the first insulating substrate 110, the light propagation layer 120 and the wavelength conversion layer 130. In the example shown in FIG. 8, the first substrate 100 comprises a first overcoat layer OC1 on, of the wavelength conversion layer 130, a side opposite to a side facing the first insulating substrate 110. The wavelength conversion layer 130 comprises the second wavelength conversion element WC2, the third wavelength conversion element WC3 and a non-wavelength conversion layer NWC. The non-wavelength conversion layer NWC is formed of a resin material such as the solid-phase supporter SOL and does not include a quantum rod. The non-wavelength conversion layer NWC may be integrally formed using the same material as the first overcoat layer OC1.

The light propagation layer 120 comprises the light-path portions 21 in areas facing the second wavelength conversion element WC2 and the third light conversion element WC3. The non-light-path portions 22 are provided in an area facing the non-wavelength conversion layer NWC and between the light-path portions 21. The light propagation layer 120 may not comprise the light-path portions 21 in an area facing the non-wavelength conversion layer NWC. The non-wavelength conversion layer NWC may not comprise the reflective film between the banks BA.

The second substrate 200 comprises a partition wall WA on, of the second insulating substrate 210, a side facing the first substrate 100. In the example shown in FIG. 8, the partition wall WA faces the bank BA and locates immediately under the bank BA. The pixel electrodes PE1 to PE3 are provided in the pixels PX1 to PX3, respectively, and are formed on, of the second insulating substrate 210, a side facing the first substrate 100. The pixel electrodes PE1 to PE3 are provided between the partition walls WA. The pixel electrodes PE1 to PE3 include a reflective layer formed of a conductive material having light reflectivity. The common electrode CE faces each of the pixel electrodes PE1 to PE3. The common electrode CE is formed of a transparent conductive material such as ITO or IZO. An emitting layer EL is provided between the pixel electrodes PE1 to PE3 and the common electrode CE. The emitting layer EL is formed of, for example, an organic material or an inorganic material emitting fluorescence or phosphorescence. A second overcoat layer OC2 is provided on, of the common electrode CE, a side facing the first substrate 100.

The emitting layer EL emits light having the second wavelength $\lambda 2$ in accordance with the current flowing between the pixel electrodes PE1 to PE3 and the common electrode CE. The light emitted from the emitting layer EL to the first substrate 100 enters the second wavelength conversion element WC2 via the light-path portions 21 in the pixel PX1. The light emitted from the emitting layer EL to the second insulating substrate 210 is reflected in the pixel electrode PE and enters the second wavelength conversion element WC2. Subsequently, the light which entered the second wavelength conversion element WC2 is converted into light having the third wavelength $\lambda 3$ by the second quantum rod QR2. The second wavelength $\lambda 2$ is, for example, a wavelength in the blue region. The third wavelength $\lambda 3$ is, for example, a wavelength in the green region. The second wavelength conversion element WC2 has a wavelength conversion function for, for example, converting blue light into green light. Similarly, the light which entered the third wavelength conversion element WC3 via the light-path portions 21 in the pixel PX2 is converted into light having the fourth wavelength $\lambda 4$. The fourth wavelength $\lambda 4$ is, for example, a wavelength in the red region. The third wavelength conversion element WC3 has a wavelength conversion function for, for example, converting blue light into red light. In the pixel PX3, the light which entered the non-wavelength conversion layer NWC via the light-path portions 21 is not converted in terms of the wavelength and is transmitted as light having the second wavelength $\lambda 2$. The wavelength conversion layer 130 may further comprise a wavelength conversion element which emits light having a wavelength different from the third wavelength $\lambda 3$ and the fourth wavelength $\lambda 4$.

In this embodiment, an effect similar to that of the above description can be obtained.

As explained above, according to the embodiments of the present invention, it is possible to improve the efficiency of use of light which entered the substrate for the display device or the efficiency of use of light which entered the display panel from the illuminating device. In this manner, the consumed power of the light source can be reduced. It is possible to reduce the consumed power of the display device or an electronic device comprising the display device.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

In the above description, a display device using a liquid crystal and a backlight is explained. However, the embodiments described herein can be also applied to a display device using an organic or inorganic light-emitting diode.

What is claimed is:

1. A display device comprising:
an insulating substrate;
a wavelength conversion element;
a light propagation layer comprising:
a light-path portion formed between the insulating substrate and the wavelength conversion element, wherein an area of a surface on the insulating substrate side is greater than an area of a surface on the wavelength conversion element side; and
a non-light-path portion formed of a material having a refractive index less than the light-path portion, the light-path portion being sandwiched between the non-light-path portions; and
a reflective film formed between the non-light-path portion and the wavelength conversion element, wherein
the reflective film comprises a first comb electrode comprising a plurality of first electrode portions, and a second comb electrode comprising a plurality of second electrode portions away from the first comb electrode, and
the first electrode portions and the second electrode portions are arranged alternately.

2. The display device of claim 1, wherein
the wavelength conversion element comprises a quantum dot which emits light having a wavelength greater than a wavelength of absorbed light, a long axis of the quantum dot being aligned in a direction along the insulating substrate.

3. The display device of claim 1, wherein
the wavelength conversion element comprises a quantum dot which emits light having a wavelength greater than a wavelength of absorbed light, a long axis of the quantum dot being aligned in a direction of arrangement of the first and second electrode portions.

4. The display device of claim 1, wherein
the wavelength conversion element comprises a first wavelength conversion element and a second wavelength conversion element adjacent to the first wavelength conversion element,
the display device further comprises a bank provided between the first wavelength conversion element and the second wavelength conversion element, and
the reflective layer is also provided between the bank and the wavelength conversion element.

5. The display device of claim 1, wherein
the wavelength conversion element absorbs light having a peak wavelength into an ultraviolet region.

6. The display device of claim 1, wherein
the wavelength conversion element comprises a first wavelength conversion element and a second wavelength conversion element, and
the display device further comprises a non-wavelength conversion layer provided between the first wavelength conversion element and the second wavelength conversion element, the non-wavelength conversion layer transmitting light without converting a wavelength of the light.

7. The display device of claim 1, further comprising a self-luminous element which emits blue light.

8. A display device comprising:
a first substrate;
a second substrate provided so as to face the first substrate; and
a liquid crystal layer provided between the first substrate and the second substrate, wherein
the first substrate comprises:
an insulating substrate;
a wavelength conversion element;
a light propagation layer comprising:
a light-path portion formed between the insulating substrate and the wavelength conversion element, wherein an area of a surface on the insulating substrate side is greater than an area of a surface on the wavelength conversion element side; and
a non-light-path portion formed of a material having a refractive index less than the light-path portion, the light-path portion being sandwiched between the non-light-path portions; and
a reflective film formed between the non-light-path portion and the wavelength conversion element,
the reflective film comprises a first comb electrode comprising a plurality of first electrode portions, and a second comb electrode comprising a plurality of second electrode portions away from the first comb electrode, and
the first electrode portions and the second electrode portions are arranged alternately.

9. The display device of claim 8, further comprising:
an illuminating device provided on, of the first substrate, a side opposite to a side facing the second substrate; and
a polarizer provided between the wavelength conversion element and the illuminating device.

10. The display device of claim 8, further comprising:
an illuminating device provided on, of the first substrate, a side opposite to a side facing the second substrate; and
a polarizer provided between the wavelength conversion element and the liquid crystal layer.

11. The display device of claim 8, further comprising:
an illuminating device provided on, of the second substrate, a side opposite to a side facing the first substrate; and
a polarizer provided between the wavelength conversion element and the liquid crystal layer.

12. The display device of claim 8, wherein
the wavelength conversion element comprises a quantum dot which emits light having a wavelength greater than a wavelength of absorbed light, a long axis of the quantum dot being aligned in a direction along the insulating substrate.

13. The display device of claim 12, wherein
the first substrate further comprises a polarizer whose transmission axis is parallel to the long axis of the quantum dot.

14. The display device of claim 13, wherein
the polarizer is provided outside an area between the wavelength conversion element and the insulating substrate.

15. The display device of claim 8, wherein
the wavelength conversion element comprises a quantum dot which emits light having a wavelength greater than a wavelength of absorbed light, a long axis of the quantum dot being aligned in a direction of arrangement of the first and second electrode portions.

16. The display device of claim 8, wherein
the wavelength conversion element comprises a first wavelength conversion element and a second wavelength conversion element adjacent to the first wavelength conversion element,
the display device further comprises a bank provided between the first wavelength conversion element and the second wavelength conversion element, and
the reflective layer is also provided between the bank and the wavelength conversion element.

17. The display device of claim 8, wherein
the wavelength conversion element absorbs light having a peak wavelength into an ultraviolet region.

18. The display device of claim 8, wherein
the wavelength conversion element comprises a first wavelength conversion element and a second wavelength conversion element, and
the display device further comprises a non-wavelength conversion layer provided between the first wavelength conversion element and the second wavelength conversion element, the non-wavelength conversion layer transmitting light without converting a wavelength of the light.

* * * * *